(No Model.) 2 Sheets—Sheet 1.
S. GARDNER.
AUTOMATIC FAN.
No. 508,299. Patented Nov. 7, 1893.
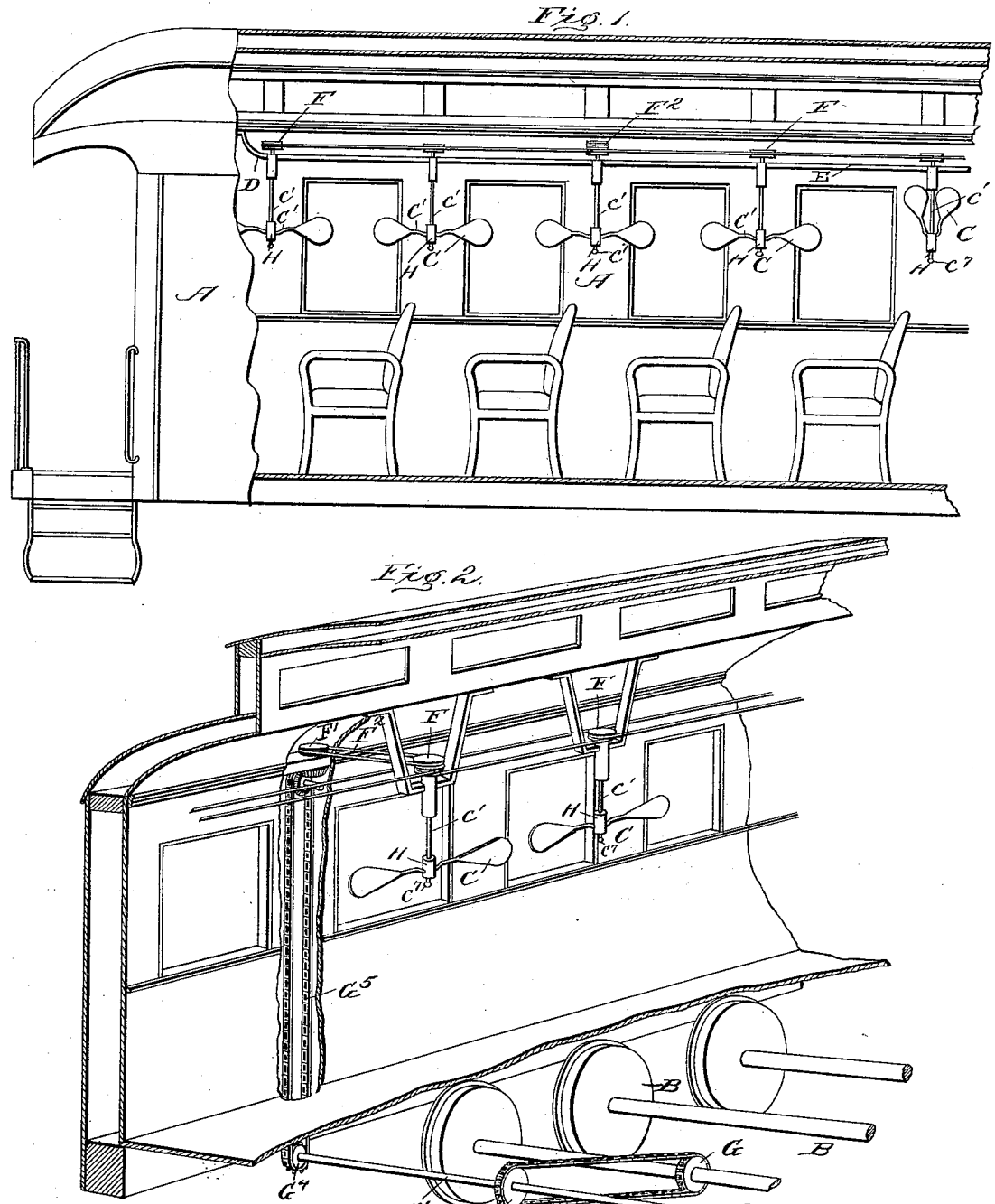

(No Model.) 2 Sheets—Sheet 2.
S. GARDNER.
AUTOMATIC FAN.
No. 508,299. Patented Nov. 7, 1893.
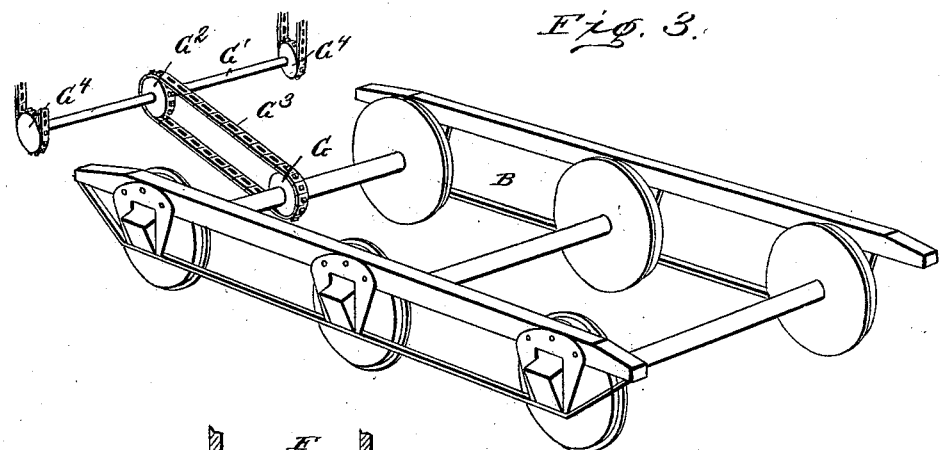
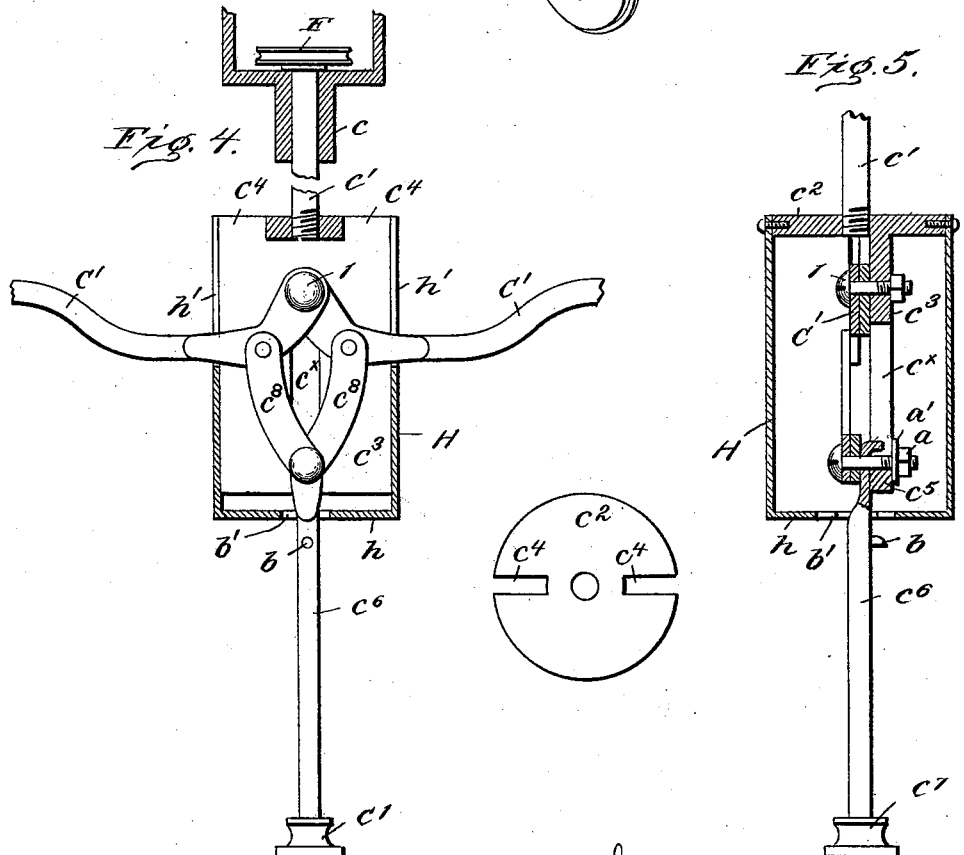
Witnesses
Saml B. Jacobson
Edwin L. Bradford
Inventor
Sigmond Gardner
by Lewis Abraham
Attorney

UNITED STATES PATENT OFFICE.

SIGMOND GARDNER, OF SAVANNAH, GEORGIA.

AUTOMATIC FAN.

SPECIFICATION forming part of Letters Patent No. 508,299, dated November 7, 1893.

Application filed April 29, 1893. Serial No. 472,353. (No model.)

*To all whom it may concern:*

Be it known that I, SIGMOND GARDNER, a citizen of the United States, residing at Savannah, in the county of Chatham and State of Georgia, have invented certain new and useful Improvements in Automatic Fans; and I do hereby declare the following to be a full, clear, and exact description of the invention, such as will enable others skilled in the art to which it appertains to make and use the same.

My invention relates to fanning apparatus, and has principal reference to means for actuating fans, in passenger cars and like moving vehicles, for causing a circulation of air for cooling and ventilating purposes.

My invention consists in means and combinations of mechanism, that actuate a series of fans by connection with the truck of traction cars, or similar moving vehicles, and to means whereby one or more of a series of fans may be thrown out of action without affecting operation of others of the series, and to novel combinations and arrangement of parts of the device whereby each fan of the series, actuated by connections with axle of the truck, is placed under independent control of a passenger, or attendant, without interfering with any others, of the series, all as hereinafter fully described, illustrated in the drawings, and specifically pointed out in the claims.

Referring to the accompanying drawings wherein like letters of reference point out similar parts on each figure:—Figure 1 is a sectional interior view of one end of a passenger car showing a series of fans, adjusted and arranged according to my invention, illustrating one means for connecting bracket hangers, to the walls or sides of the car, and one form of mechanism for communicating motion to the series of fans, four being shown in action, one shown closed up out of action. Fig. 2. is a similar view, with flooring of the car removed, exposing the axles and truck wheels, showing means for connecting thereto the operating mechanism for communicating motion from said axles to the series of fans. Fig. 3. is a detail perspective view of a car truck, showing the main driven shaft through which the fans are actuated. Fig. 4. is a detail view of one fan with the hanger and support, parts being in section showing mechanism by which each fan can be independently thrown into and out of action. Fig. 5. is a further detail of parts thereof.

In the drawings, A, represents a car of ordinary conformation; B, the truck axles and B' wheels; C, the fans which are shown as arranged to depend at points between seats although location of the separate fans may be changed as presently set forth.

Brackets or hangers, D, are secured to the inner sides or walls of the car, which carry supports, E, extending lengthwise of the car, said supports being apertured at given distances, for reception of upper end of tubular incasements, $c$, and operating pulleys, as hereinafter described. The brackets or hangers, D, extend to bring said supports to a point about centrally of the width of the car seats, and about in line with the seat back, so that the current of air, set in motion by the fans, shall be directed toward the occupants of the adjacent seat.

Pending from the supports, E, are tubular incasements, $c$ provided at their upper ends with double belt or sprocket wheels, F, rigidly connected or formed integral, one of which is coupled with a similar wheel, F', on one side of the car from which it receives motion, and the other with the next adjacent wheel for communicating motion thereto, and so on in succession, whereby each of the series of wheels, F, are caused to revolve. One of the series of wheels, is provided with three peripheral grooves or sprocket teeth for receiving action, from the driving wheel, F', and in turn through belt or chain connection transmitting motion to the next adjacent wheel to the right and left thereof. The whole series is driven from one of the axles of the car truck in the following manner. Mounted on any one of said axles, is a sprocket or belt wheel, G. Extending under the car, and mounted on suitable bearings, is a transverse shaft, G', provided at a median point of its length with a sprocket or belt wheel, $G^2$, to which is transmitted motion by means of endless belt, $G^3$, passing over sprocket wheel, G, of axle of the truck and wheel, $G^2$, in alignment therewith. The driven shaft, G', extends transversely the full width of the vehicle. The shaft, G', at each terminal end, is provided with a sprocket wheel, G$^4$, which is coupled with, and transmits motion through an endless belt or sprocket chain, G$^5$, surrounding the end wheels, G$^4$, to the wheel, F', located near the top of the car, as before described, and which in turn is coupled through short belt or chain, F$^2$, to the fan wheel, F, having three peripheral grooves or sprockets and thereby, when the shaft, G', is revolved operating the whole series of fans, as hereinbefore set forth.

In the construction illustrated in Fig. 1, the chain or belt, G$^5$, runs in a channel so that said belt, or similar transmitting power, shall therein run inside of the car. Said channel may be incased by covering which will match the other finish of the vehicle, thereby protecting the side belting and keeping it from exposure.

The transverse shaft, G', may be inclosed in any desired form of housing, so that it may be reached from underneath the car for repairing and other purposes. Where said shaft cannot be placed directly above its driving axle of the same truck it can be adjusted at any point in relation thereto, for instance at an angle of ninety degrees, more or less.

Where the device is employed in sleeping cars the hanging brackets can be placed above the central aisle with fans to work between the lights or beneath them, and the same arrangement may be adopted in ordinary vehicles if desired, in which case there will be but one central series of fans in lieu of one on either side. The means for controlling each fan independently is illustrated in Figs. 4, and 5.

Mounted on one end of the fan shaft, $c'$, is a disk or head, $c^2$, provided with an integral depending flat vertical plate, $c^3$. The disk, $c^2$, has transverse slots, $c^4$, extending outwardly in a right line from shaft, $c'$, to periphery of said disk, the plate, $c^3$, being fastened to one edge of said slots and parallel therewith. The plate has a central vertical elongated slot, $c^x$, extending from about midway of its length and terminating near its lower edge, leaving a lower cross piece, $c^5$, of the plate, $c^3$, acting as a limiting stop for a purpose presently pointed out. Pivoted within said slot is a short rod, $c^6$, which after passing through lower plate, $h$, of cylindrical casing, H, is provided with operating knob or handle, $c^7$, preferably milled outwardly for a purpose that will be readily understood. The rod, $c^6$, is maintained engaged to plate, $c^3$, by an outer nut, $a$, preferably provided with washer, $a'$, to facilitate the upward and downward movement thereof without undue friction, said rod, adjusted as described, being free to slide reciprocatingly within the slot for operating the fan arms. Loosely pivoted to upper end of rod, $c^6$, extending from each side thereof is a curved link, $c^8$, which are in turn pivotally connected to the inner ends of the fan arms, C'. Said arms are connected together by a pivot, $l$, and to plate, $c^3$, next above upper end of slot, $c^x$. The links, $c^8$, are engaged by the same pivot that connects them to rod, $c^6$, the pin of which passes through slot, $c^x$, outwardly secured by nut, $a$, as previously described. The fan arms, C', are bent in such manner that when extended they shall be practically at right angles to the fan shaft, $c'$, and when folded shall lie closed upwardly against, and parallel with, said shaft. The lower end of rod, $c^6$, is provided with lug or tooth $b$, adapted to engage openings, $b'$, in lower plate, $h$, of incasement, H, said rod being adapted to be slightly diverged from a true vertical line into said notches and thereby maintain the fan arms in locked position, whether closed upwardly or extended transversely.

The plate, $c^3$, and described connections thereof are inclosed in a cylindrical incasement, H, closed at its upper end with disk, $c^2$. Said casing is provided with aligning vertical slots, $h'$, through which the fan arms are free to move when raised or lowered. The lower end of incasement, H, is closed by plate $h$, having central orifice for passage therethrough of handle rod, $c^6$, said orifice having extensions, $b'$, for engagement of lugs, $b$, on said rod.

From the foregoing description, in connection with the drawings, the nature and object of my invention, and its practical operation, will be readily understood by all familiar with analogous devices.

The connections for communicating motion from the axle of the truck may be either an endless belt, chain or other well known form of mechanism.

The operation of the device is as follows:— When the car is in motion, the fan shafts are all caused to revolve through the belt or chain connections, and if the fans are all thrown out, a draft will be created from each. If however, any one or more persons desire to stop any particular fan, by simply pushing up the rod, and engaging the tooth with the perforation which folds the fan blades up against the shaft, and while said shaft continues to revolve, no draft will be created by said closed blades. It will thus be seen that any one of the series of fans may be thrown out of action without in any manner affecting others of the series.

Having thus fully described my invention and the manner of its operation, what I claim, and desire to secure by Letters Patent of the United States of America, is—

1. In a fan controlling device, the fan shaft carrying the head, the fan arms pivoted thereto, the reciproctating rod connected to the fan arms, through links pivoted thereto, and means for holding the fan blades independently into or out of action, substantially as set forth.

2. A revoluble fan having arms, C', pivotally connected to vertical plate $c^3$, depending from shaft, $c'$, said shaft having, permanently connected to its lower end, horizontal disk, $c^2$, provided with opposite transverse slots, $c^4$, cylindrical casing, H, provided at its upper section with opposite vertical slots, $h'$, connecting with disk slots, $c^2$, curved links $c^8$, the upper ends of which are pivoted to opposite fan arms, said links, at their lower ends pivoted to rod, 6, extending vertically through bottom plate, $h$, of casing, H, handle knob, $c^7$, at terminal end of rod, 6, said rod having outwardly extending lugs, $b$, adapted to be turned within extensions, $b'$, of orifice, $b$, in plate, $h$, whereby as said rod is reciprocated vertically within and without incasement, H, the fan arms will pass upwardly and downwardly through aligning slots of disk, $c^2$, and incasement, H, and said arms interlocked in desired position by lugs, $b$, engaging plate, $h$, all in combination with gearing actuated by driven shaft, $G'$, to which motion is conveyed by truck of a movable vehicle, as and for the purpose intended, substantially as described.

3. In a revoluble fan, tubular incasement, H, having at opposite sides vertical slots, $h'$, upper closing disk, $c^2$, provided with opposite transverse slots, $c^4$, extending to its periphery and opening into slots, $h'$, of tubular incasement, H, fan shaft, C, permanently connected to disk, $c^2$, and extending vertically therefrom the upward end of said shaft provided with horizontal pulley, F, hanger, $c$, supporting said pulley, plate, $c^3$, extending downwardly having vertical slot, $c^\times$, in combination with links, $c^8$, pivotally connected to fan arms, $C'$, and operating handle rod, $c^6$, adapted to be reciprocated within slot, $c^\times$, said incasement and its connected fan arms adapted to be revolved by gearing connected to pulley, F, and driven shaft, $G'$, as and for the purpose intended, substantially as described.

In testimony that I claim the invention above set forth I affix my signature in presence of two witnesses.

SIGMOND GARDNER.

Witnesses:
 M. I. EPSTEIN,
 S. EPSTEIN.